US010264551B2

(12) United States Patent
Borras et al.

(10) Patent No.: US 10,264,551 B2
(45) Date of Patent: Apr. 16, 2019

(54) MOBILE VIBRATORY DEVICE, SYSTEM, AND METHOD FOR PHYSIOTHERAPEUTIC APPLICATIONS

(71) Applicants: Jaime A. Borras, Miramar, FL (US); Mauricio Bendeck, Miami, FL (US)

(72) Inventors: Jaime A. Borras, Miramar, FL (US); Mauricio Bendeck, Miami, FL (US)

(73) Assignee: TRACTOUCH MOBILE PARTNERS, LLC

( * ) Notice: Subject to any disclaimer, the term of this patent is extended or adjusted under 35 U.S.C. 154(b) by 518 days.

(21) Appl. No.: 14/838,273

(22) Filed: Aug. 27, 2015

(65) Prior Publication Data

US 2016/0058658 A1 Mar. 3, 2016

Related U.S. Application Data

(60) Provisional application No. 62/042,364, filed on Aug. 27, 2014.

(51) Int. Cl.
*A61H 23/02* (2006.01)
*H04L 12/24* (2006.01)
(Continued)

(52) U.S. Cl.
CPC ........ *H04W 68/06* (2013.01); *A61H 23/0218* (2013.01); *A61H 23/0263* (2013.01);
(Continued)

(58) Field of Classification Search
CPC ........ A61H 1/005; A61H 19/00; A61H 19/30; A61H 19/32; A61H 19/34; A61H 19/40; A61H 19/44; A61H 19/50; A61H 23/02; A61H 23/0218; A61H 23/0254; A61H 23/0263; A61H 2023/0209; A61H 2023/0272; A61H 2023/0281; A61H 2201/0157; A61H 2201/0184; A61H 2201/12; A61H 2201/1207; A61H 2201/1215; A61H 2201/1223; A61H 2201/164; A61H 2201/165; A61H 2201/50; A61H 2201/5002; A61H 2201/5005; A61H 2201/5007; A61H 2201/501; A61H 2201/5012; A61H 2201/5015; A61H 2201/5023; A61H 2201/5025; A61H 2201/5035; A61H 2201/5038; A61H 2201/5043; A61H 2201/5046;
(Continued)

(56) References Cited

U.S. PATENT DOCUMENTS 4,674,743 A * 6/1987 Hirano ................ A61B 5/0017 340/323 R
4,779,615 A * 10/1988 Frazier .................. H04R 1/028 601/111

(Continued)

*Primary Examiner* — Gary D Urbiel Goldner
(74) *Attorney, Agent, or Firm* — Scott M. Garrett

(57) ABSTRACT

A method and apparatus for providing vibration physiotherapy includes a vibration accessory that can produce vibrations over a range of frequencies, and is controlled by a communication device. The communication device executes a physiotherapy application program via which a user can select various operating modes to control vibration of the vibration accessory. The vibrations can be selected to be a constant frequency or the vibrations can be controlled to vary over time.

19 Claims, 7 Drawing Sheets

(51) Int. Cl.
*H04L 12/26* (2006.01)
*H04M 1/725* (2006.01)
*H04W 4/021* (2018.01)
*H04W 68/00* (2009.01)
*H04W 68/06* (2009.01)

(52) U.S. Cl.
CPC .......... *H04L 41/069* (2013.01); *H04L 43/106* (2013.01); *H04M 1/7253* (2013.01); *H04M 1/72527* (2013.01); *H04W 4/021* (2013.01); *H04W 68/005* (2013.01); *A61H 2201/0184* (2013.01); *A61H 2201/164* (2013.01); *A61H 2201/165* (2013.01); *A61H 2201/501* (2013.01); *A61H 2201/5015* (2013.01); *A61H 2201/5046* (2013.01); *A61H 2201/5048* (2013.01); *A61H 2201/5069* (2013.01); *A61H 2201/5084* (2013.01); *A61H 2201/5097* (2013.01); *A61H 2205/088* (2013.01); *H04M 1/72558* (2013.01)

(58) Field of Classification Search
CPC .... A61H 2201/5048; A61H 2201/5069; A61H 2201/5084; A61H 2201/5097; A61H 2205/088; A63B 21/00192; A63B 21/00196; A63B 21/002; A63B 21/0023; A63B 21/005; A63B 21/0058; A63B 21/0059; A63B 24/0087; A63B 2024/009; A63B 2024/0093; A63B 2024/0096; A63B 71/0054; A63B 71/0622; A63B 71/0686; A63B 2071/0063; A63B 2071/0072; A63B 2071/0081; A63B 2071/009; A63B 2071/0625; A63B 2071/0627; A63B 2071/063; A63B 2071/0675; A63B 2071/068; A63B 2071/0683; A63B 2220/64; A63B 2225/20; A63B 2225/50; A63B 2225/52; A63B 2225/54
See application file for complete search history.

(56) References Cited

U.S. PATENT DOCUMENTS 5,101,810 A * 4/1992 Skille ................. A61H 23/0236 5/904
6,027,463 A * 2/2000 Moriyasu ........... A61H 23/0236 601/46
8,801,591 B1 * 8/2014 Lasorso, Jr. ........... A61H 1/005 600/28
9,457,166 B1 * 10/2016 Lasorso, Jr. .......... A61M 21/02
2002/0065477 A1 * 5/2002 Boyd ..................... A61H 19/44 601/47
2003/0083599 A1 * 5/2003 Kitov ................ A61H 23/0236 601/84
2005/0054958 A1 * 3/2005 Hoffmann ........... A61B 17/225 601/46
2005/0201574 A1 * 9/2005 Lenhardt ........... A61H 23/0245 381/151
2006/0025683 A1 * 2/2006 Hoffmann ................ A61B 8/08 600/439
2007/0025575 A1 * 2/2007 Oser ........................ A47C 7/72 381/333
2007/0093732 A1 * 4/2007 Venturi ............. A61H 23/0236 601/47
2008/0275343 A1 * 11/2008 Hoffmann ................ A61B 8/08 600/439
2009/0069728 A1 * 3/2009 Hoffmann ................ A61B 8/08 601/46
2009/0076421 A1 * 3/2009 Grant, Jr. ............... A61H 11/00 601/47
2010/0222723 A1 * 9/2010 Hoffmann ................ A61B 8/08 601/107
2011/0237989 A1 * 9/2011 Vandenbelt ............ A47C 7/425 601/47
2013/0102937 A1 * 4/2013 Ehrenreich .............. A61H 1/00 601/47
2013/0116503 A1 * 5/2013 Mertens ................. A61H 19/34 600/38
2013/0281897 A1 * 10/2013 Hoffmann ................ A61B 8/08 601/107
2014/0010387 A1 * 1/2014 Cohen ................ A61H 23/0236 381/151
2014/0018713 A1 * 1/2014 Elenga ............... A61H 23/0218 601/78
2014/0142374 A1 * 5/2014 Makower ............... A61H 19/34 600/38
2014/0163439 A1 * 6/2014 Uryash .................... A61B 8/08 601/47
2014/0207032 A1 * 7/2014 Dematio ................ A61H 19/00 601/46
2014/0273849 A1 * 9/2014 Lee ....................... G06F 1/1694 455/41.2
2014/0276193 A1 * 9/2014 Doochin ............ A61H 23/0245 600/552
2015/0056975 A1 * 2/2015 Park ......................... H04B 5/02 455/418
2015/0141880 A1 * 5/2015 Ehrenreich ............ A61H 23/00 601/47
2016/0022532 A1 * 1/2016 Makower ............... A61H 23/00 600/38
2016/0235621 A1 * 8/2016 Choe ...................... A61H 7/005

* cited by examiner

400

402 404

| | | |
|---|---|---|
| 406 | A | PATTERN A |
| | B | PATTERN B |
| | C | PATTERN C |
| | ⋮ | ⋮ |
| 408 | USER 1 | USER PATTERN 1 |
| | USER 2 | USER PATTERN 2 |

MOBILE VIBRATORY DEVICE, SYSTEM, AND METHOD FOR PHYSIOTHERAPEUTIC APPLICATIONS

CROSS REFERENCE

This application claims the benefit of prior U.S. provisional patent application No. 62/042,364 filed Aug. 27, 2014, the entirety of which is hereby incorporated by reference.

FIELD OF THE DISCLOSURE

The present disclosure relates generally to the field of physiotherapy, and more particularly to the use of vibration devices in physiotherapeutic applications.

BACKGROUND

Mobile communication devices are in widespread usage, particularly in the form of "smart" cellular telephone devices. It is common for such devices to have a "silent" ring mode where, upon receiving a message, or an indication of an incoming phone call, a vibration motor is activated to cause the device to vibrate. Typically in such cases no audible alert (i.e. ringing) is used, although both can be used together if selected by the user of the device.

A common design goal with such devices is, generally, to reduce their size and weight, subject to other design choices such as, for example, display size. This tends to limit the efficacy of vibration devices, leading to people not noticing when the device is vibrating under many conditions. For example, a smartphone carried in a user's pocket while operating a motor vehicle in traffic can result in insufficient vibration and distraction such that the user may not notice the smartphone vibrating in response to an incoming phone call. In louder environments, such as construction sites, where communication can be crucial at times, the vibrations of machinery and construction activities can mask the vibration of a typical smartphone vibration motor completely so that the user does not get alerted to incoming communications.

In the field of physiotherapy vibration is used for a wide variety of applications, including relaxation, biofeedback, and others. The low magnitude of vibration produced by conventional cellular telephone devices make them useless, however, for physiotherapy applications. On the other hand, a typical vibration device that produces vibrations of sufficient magnitude for physiotherapy applications does not comprise a useful means of automating control of the vibration device in a mobile format.

Accordingly, there is a need for a method and apparatus for providing vibrational physiotherapy in a way that overcomes the deficiencies of the prior art.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
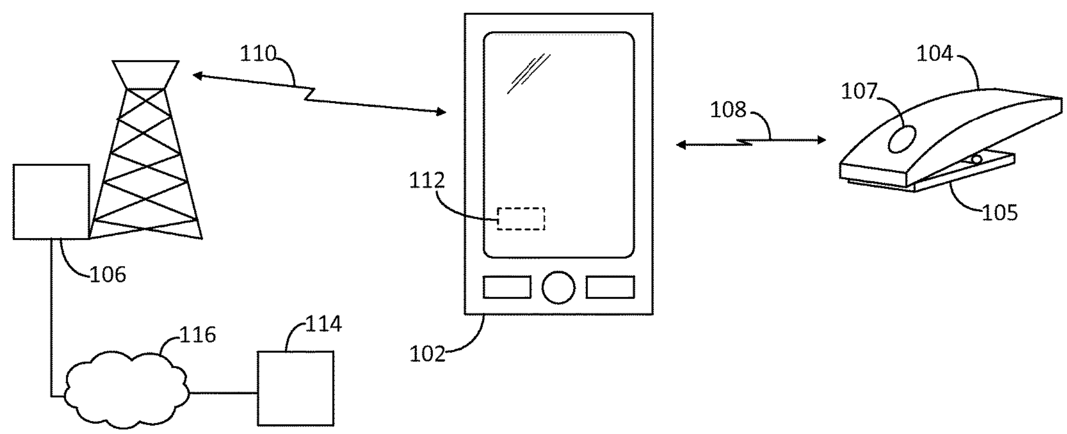
FIG. 1 is a block diagram of a vibratory alert system in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments disclosed herein solve the problems associated with the prior art by providing, for example, a method of generating a vibration for use in physiotherapy that includes coupling a vibration accessory to a communication device. The communication device executes a physiotherapy application that controls the vibration accessory, and, responsive to the control of the communication device, a frequency of vibration produced by the vibration accessory is varied. The method also includes playing sound by the communication device over a speaker device of, or connected to the communication device. The method further includes the communication device varying control of the frequency of vibration produced by the vibration accessory in correspondence with the sound played by the communication device.

FIG. 1 is a block diagram of a vibratory alert system 100 in accordance with some embodiments. The system includes a communication device 102 and a vibration alert accessory 104. The communication device is capable of communicating, via radio signals, with a communications infrastructure 106 such as a cellular network or other wide area radio communications network (e.g. trunked two-way radio) using an appropriate wide area radio channel 110 with a wide area radio transceiver contained in the communication device 102. The communication device 102 can be a smartphone, or similar communication device that is capable of storing and executing program code (i.e. software). In some embodiments the communication device can be a portable two-way radio device (i.e. uses a half-duplex, "always on" communication modality). In general, the communication device contains circuitry to perform conventional communication and computation functions, and input and output functions, as is common in communication devices presently offered for sale.

The communication device 102 contains a vibration alert application 112, which is a program that can be instantiated and executed by the communication device 102, and causes the communication device 102 to perform functions, operations, and behaviors in accordance with the teachings herein. The communication device 102 and the vibration alert accessory 104 are communicatively linked. In some embodiments the link 108 can be a wired link, such as through an audio jack or port of the communication device 102, a serial connection such as a Universal Serial Bus (USB), or other similar wired connections. Using an audio port wired connection, the communication device 102 can generate audio signals of certain frequencies as control signals that can be decoded by the vibration alert accessory 104.

In some embodiments the link 108 can be achieved using a local wireless radio protocol, such as, for example, a wireless link in accordance with the Institute of Electrical and Electronic Engineers (IEEE) specification no. 802.11 (known in industry as "WiFi"), or 802.15 (e.g. the protocol commonly known by the tradename "BlueTooth"), or other similar low power, low range radio communication protocols. The vibration alert accessory 104 can have an identifier that is shared with the communication device 102 so that the communication device 102 and vibration alert accessory 104 can identify each other in wireless communications. The identifier can be, for example, the media access control (MAC) address of each device's respective network interface circuit, as is known.

Because the vibration alert accessory 104 is not subject to the design constraints (e.g. low weight, thin or small volume) of the communication device 102, it uses a more robust vibration system than can be placed in communication devices, which obviates the need for a larger communication device 102 that does incorporate such a vibration system. Accordingly, the vibration alert accessory 104 can produce vibrations having amplitude on the order of 5-10 times or more than that of a typical vibration motor used in communication devices. The vibration alert accessory 104 can include a clip 105 on an external portion of a housing of the vibration alert accessory 104 so that it can be clipped onto a user's clothing in a place that will help ensure the user/wearer feels vibrations produced by the vibration alert accessory 104. Other form factors can be employed as well, where, for example, the vibration alert accessory can be formed into a helmet or as a bracelet or anklet, for example.

Briefly, the communication device 102, upon receiving a message (i.e. call alert, voice communication, short message system or "text" message, etc.), transmits an alert message to the vibration alert accessory 104 over link 108 (either wired or wireless). In some embodiments the communication device 102 analyzes the received message to determine a category or other classification of the message and selects or indicates a corresponding alert pattern to be used by the vibration alert accessory 104, and indicates the category in the alert message sent via link 108. The vibration alert accessory 104, upon receiving the vibration alert message, carries out the vibration alert in accordance with the indicated category or classification, using the corresponding vibration pattern. The different vibration patterns allow the user to determine the general nature of the incoming message received by the communication device 102 without having to look at the communication device 102. In some embodiments the vibration alert message can indicate an immediate emergency, prompting the user to take action. In some embodiments the vibration alert accessory 104 can include a user input means, such as a button 107, to indicate that the user has detected the alert. The vibration alert accessory 104 can, upon receiving such user input, can transmit an indication of the input to the communication device 102 so that the vibration alert application can make note that the user has acknowledged the alert. The communication device 102 can, in response, transmit an indication of the user's acknowledgement of the alert to an administrator server 114 or other similar entity to record the user's acknowledgment of the alert. The administrative server 114 can be a backend server operated by an entity with which the user of the communication device 102 is associated, and can be connected to the wide are radio communications network 106 via a wide area data network 116 such as, for example, the Internet. In another embodiment, the vibration pattern is preselected by the user according to its level of priority and per contact name or groups of contacts.

Figure 2:
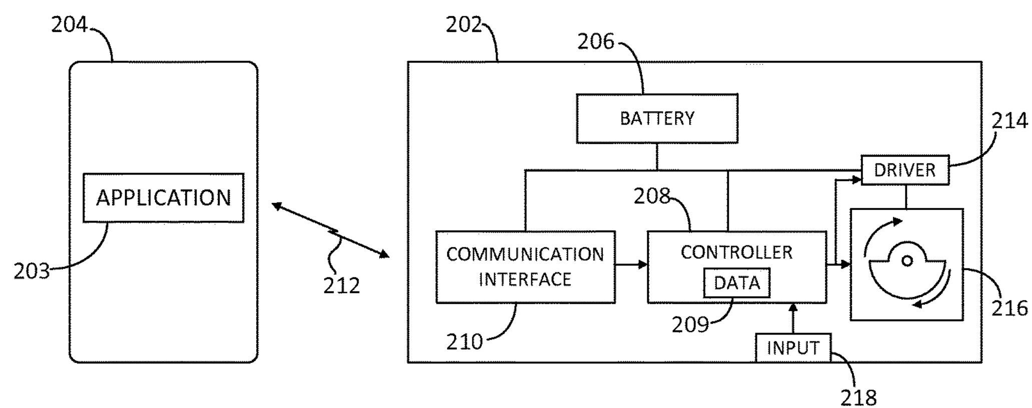
FIG. 2 is a block schematic diagram of a communication device and a vibration alert accessory in accordance with some embodiments.

FIG. 2 is a block schematic diagram 200 of a communication device 204 and a vibration alert accessory 202 in accordance with some embodiments. The communication device 204 includes general computing circuitry that can operate an operating system such as, for example, that known by the trade name "Android," by Google, Inc. The computing circuitry can include internal memory and connector means for accepting external memory such as, for example, a memory card. Accordingly, the communication device 204 can execute a vibration alert application 203 that can be installed in the communication device 204. The application 203 allows the communication device 204 to interact with the vibration alert accessory 202 over a communication channel 212, which can be wired or wireless. The vibration alert accessory 202 includes a battery 206 for providing power to circuitry in the vibration alert accessory 202, including a communication interface 210, a controller 208, a vibration motor 216 and a motor driver circuit 214. The controller includes memory that contains vibration pattern data 209. When the communication device 204 receives a communication intended for the user of the communication device 204, it transmits a vibration alert message to the vibration alert accessory 202 over the communication channel 212. The vibration alert message is received by the communication interface 210 and provided to the controller 208. The controller can determine which of a plurality of vibration patterns to use, based on the contents of the vibration alert message, and select an appropriate or corresponding pattern from the vibration pattern data 209. The patterns can specify variations in magnitude of the vibrations, as well as variations in time (e.g. duty cycle). Once the vibration pattern is selected, the controller 208 controls the driver circuit 214 to cause the motor 216 to create vibration in accordance with the selected pattern. The vibration motor 216 can employ an eccentric cam which, upon being rotated by the motor, creates vibration, as is known. The vibration alert accessory 202 can also include a user input means, such as a button 218 to acknowledge the vibration alert. Upon pressing the button 218, the controller 208 can control the driver 214 to cease rotation of the vibration motor 216 to conserve battery energy. In some embodiments, upon the user acknowledging the alert by, for example, pressing the button 218, the controller 208 can generate an acknowledgment message that is sent to the communication device 204 over the communication channel 212 for use by the vibration alert application 203. In some embodiments the acknowledgement occurs when the user answers the voice call or text using the communication device 204. Thus, input via the button 218, or operation of the communication device 204, in response to a vibration alert, can be taken by the application 203 as an acknowledgement of the alert. If the user answers the call or otherwise operates the communication device in response to the alert, the application 203 will send a message to the vibration alert accessory 202 to cease the vibration alert.

The battery 206 can be a rechargeable battery that can be removed and charged in a separate charger, or charged by connecting the vibration alert accessory 202 to a charger, either by wire or by wireless coupling (e.g. inductive charging). In some embodiments, the battery can consist of multiple non-rechargeable alkaline cells. The controller 208 can periodically send battery status messages to the vibration alert application 203 to be displayed on the communication device 204 so that the user can see the charge remaining in the battery 206.

Figures 3, 4:
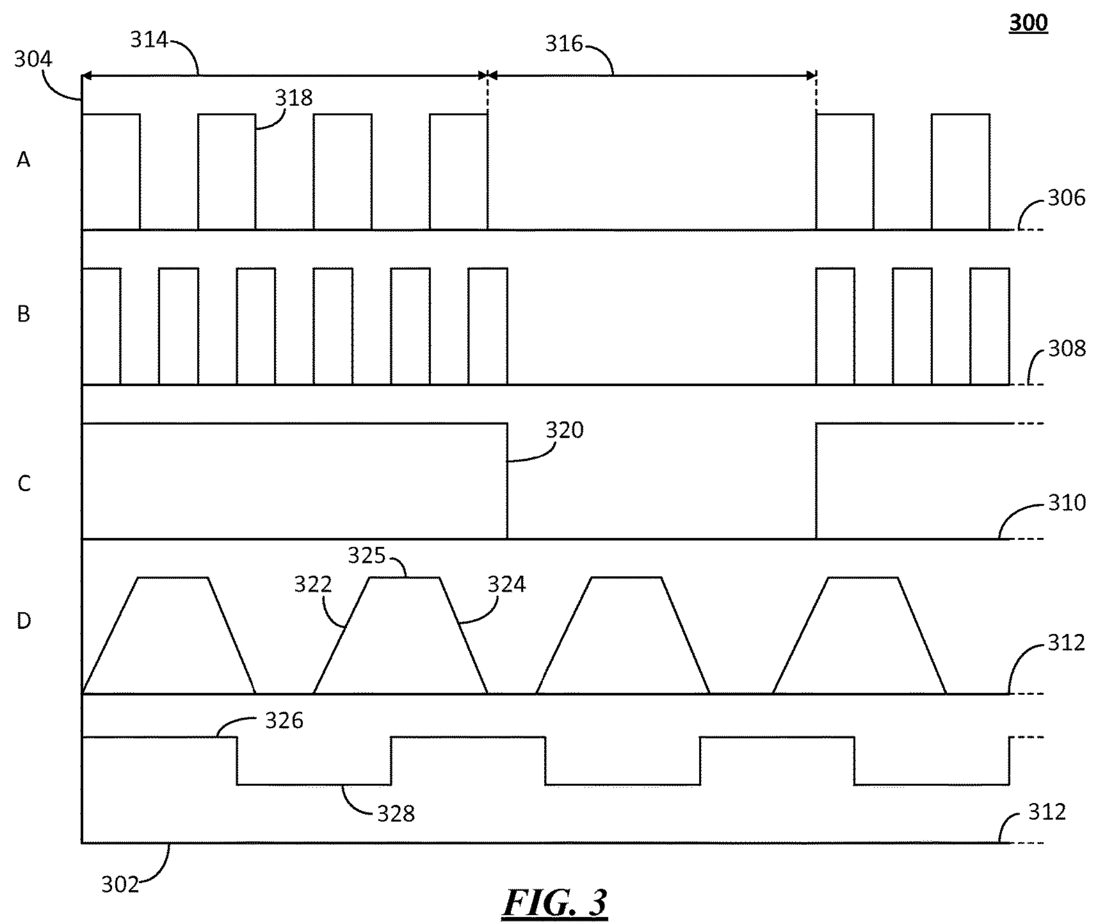
FIG. 3 is a graph chart of a several exemplary vibration patterns to be used by a vibration alert accessory in accordance with some embodiments.
FIG. 4 is a table for storing vibration pattern identifiers and a corresponding vibration pattern data for use by a vibration accessory in accordance with some embodiments.

FIG. 3 is a graph chart 300 of several exemplary vibration patterns to be used by a vibration alert accessory in accordance with some embodiments. The horizontal axis 302 represents time, increasing to the right, and the vertical axis 304 represents vibration magnitude, increasing toward the top. The magnitude can be expressed in terms of acceleration relative to Earth gravity, g. A typical smartphone vibration motor can produce an acceleration of about one g. In some embodiments, the vibration motor of the vibration alert accessory can produce an acceleration of at least five g, meaning five times more acceleration than Earth gravity. The magnitude of the vibrations, for rotary-based vibration motors, is dependent on the mass of the eccentric cam and the rotational velocity at which the vibration motor spins the eccentric cam.

In some embodiments the vibratory system can include a mass that is linearly oscillated back and forth along an axis. For example, a toroidal permanent magnet can be mounted on a rod with biasing springs on either side to urge the toroidal magnet into a center of the rod. Windings of opposing polarities can be wound around respective halves of the rod, allowing the toroidal magnet to move inside the windings. By passing current through one of the windings a magnetic field is created that causes the toroidal magnet to move. Thus, by varying the magnitude of the current, that magnitude of the magnetic force acting on the toroidal magnet can be varied, allowing different magnitude (i.e. force) of the vibration of the toroidal magnet. By alternating the energizing of the coils, the toroidal magnet can be thus caused to oscillate back and forth on the rod in a way that allows independent control of magnitude and frequency of the oscillations.

Four exemplary vibration patterns, 306, 308, 310, 312, 313 are shown. Many other such patterns can be formed in accordance with the teachings herein. The patterns can be periodic, and repeated one or more times by the vibration alert accessory. In exemplary pattern 306 during a first portion 314 a series of pulses 318 occur where, in each pulse, the vibration motor is turned from an off state to an on state at a selected amplitude. Then during a second portion 316 no pulses occur and the vibration motor remains off. The pattern can repeat portions 314 and 316. In some embodiments the vibration pattern can be repeated for a preselected period of time or until a user input is received indicating acknowledgement of the vibration alert. The number of pulses can be varied for other patterns to be used for other alerts. For example, a user can give priority to various contacts in an address book on the user's communication device. Contacts can be given a priority from 1 to 4, which can correspond to vibration patterns using 1 to 4 pulses in portion 314. Pattern 308 shows an example of a pattern similar to that of pattern 306, but with more pulses having shorter duration per pulse, and possibly at a different amplitude. Pattern 310 shows an example of one long pulse followed by an off period. Pattern 312 utilizes ramp up 322 and ramp down 324 segments, and a constant amplitude portion 325. During the ramp up and ramp down segments 322, 324 the vibration amplitude increases over time and decreases over time, respectively. In pattern 313 the vibration is continuous, but the magnitude is periodically varied from times of relatively high magnitude 326 and times of relatively lower magnitude 328. Other patterns can exist that change over time. For example, a vibration alert can start with a relatively low magnitude and ramp up in magnitude until receiving an acknowledgement input from the user. Likewise, patterns can be mixed; for example, a ramp can be followed by a series of pulses.

As mentioned various combinations of pulse length, ramp length, amplitude, and pattern period can be used to create unique vibration patterns, which can be assigned to different categories of incoming messages. Both the duty cycle and vibration magnitude can be modulated in various ways to create unique patterns that can be discerned though tactile sensation by a user wearing the vibration alert accessory. In some embodiments the vibration alert application on the communication device can allow a user to select vibration patterns for various categories (a particular contact in the user's address book can be considered to be a category). In some embodiments the vibration alert application on the communication device can allow a user to create vibration patterns which can be stored and assigned to a category by the user.

FIG. 4 is a table 400 for storing vibration pattern identifiers and corresponding vibration pattern data for use by a vibration accessory in accordance with some embodiments. The table 400 can be stored, for example, in the vibration alert accessory, and can included preset patterns as well as user-specified patterns. In some embodiments the table 400 is stored only in the communication device, and upon receiving a message, the communication device can send the vibration pattern data to the vibration alert accessory in the alert message. Each entry in the table includes a vibration pattern identifier 402 and corresponding vibration pattern data 404. The vibration pattern data can be used by the controller of the vibration alert accessory to drive the motor so that it vibrates in correspondence to the vibration pattern data. In some embodiments when the communication device receives a message, the communication device can determine the vibration pattern to be used and send only the vibration pattern identifier in the alert message. The vibration alert accessory can then use the vibration pattern identifier to locate the corresponding vibration pattern data in the table 400. In some embodiments the table 400 can include preset patterns 406 that are programmed into the table upon manufacture of the vibration alert accessory, as well as user specified or created patterns 408.

Figure 5:
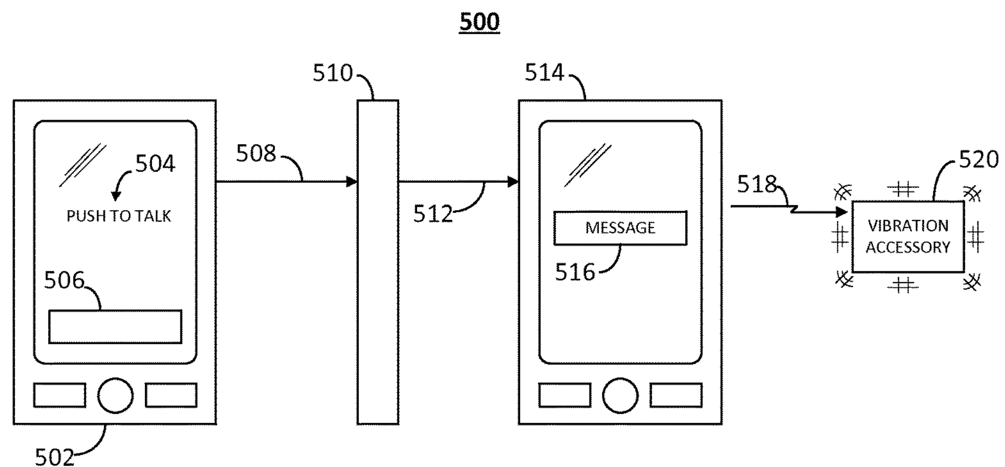
FIG. 5 is system diagram of a push to vibrate alert system in accordance with some embodiments.

FIG. 5 is system diagram of a push to vibrate alert system 500 in accordance with some embodiments. In some embodiments a vibration alert application program can provide a "push to talk" (PTT) functionality. In some embodiments the communication devices can be designed to have a dedicated PTT button that is mechanically actuated by a user to activate transmission, as is well known. PTT functionality allows a user at a first communication device 502 using the vibration alert application 504 to provide an input such as, for example, a "press" or touch input at graphical representation of a button 506. Alternatively, a PTT button can be provided on the device 502, in accordance with conventional two-way radio communication. Upon pressing the graphical button 506, or the mechanical PTT button when the first communication device 502 is designed as a portable two-way radio device, the first communication device 502 turns on its microphone to receive speech from the user of the first communication device 502, which is transmitted in real, or near-real time to a second communication device 514. The speech signal can go from the first communication device 502 to a communication system 510, as indicated by signal 508. The communication system 510 re-transmits the signal to the second communication device 514 as indicated by signal 512. As the signal 512 is being received at the second communication device 514 the second communication device plays the received speech over a loudspeaker or other audio component of the second communication device 514. The second communication device 514, while receiving the signal 512, can also record the signal to allow some playback of the content of the signal 512. Under normal conditions the volume of the loudspeaker of the second communication device 514 is loud enough to be heard by a user of the second communication device 514 (assuming the user is near enough) without having to hold the second communication device 514 to the second user's ear (e.g. like a phone). The second communication device 514 can produce a conventional audible alert, however, since the user may be located in a noisy area, or may be wearing hearing protection. The second communication device 514 can send an alert message 518 to an associated vibration alert accessory 522, indicating a vibration pattern. The second communication device 514 can also provide a visual alert 516 to further indicate the incoming message. In some embodiments, when the first and second communication devices are near enough to each other, they can signal each other directly, without need for the infrastructure of the communication system 510.

In some embodiments the communication devices 502, 514 can include a message analyzer function that analyzes the content of the message to determine if there is an indication of a special condition that requires a special alert. For example, if the received message is a speech message, as in a PTT voice signal, the message analyzer can include a voice analyzer that determines whether the speaker's voice indicates stress or commands. For example, the user of the first communication device 502 can see a condition which presents an imminent threat to the user of the second communication device 514, and using the PTT function can yell "LOOK OUT!" The emphatic nature of the speech can be detected by the message analyzer of the second communication device 514 and in response, the second communication device 514 can send an alert message 518 to the vibration alert accessory that corresponds to an imminent danger so that the user of the second communication device 514 can survey the situation and take appropriate action. In some embodiments the message analyzer can examine the contents of a received text message for code words or commands that require special alerts, and indicate such in the alert message sent to the vibration alert accessory.

Figure 6:
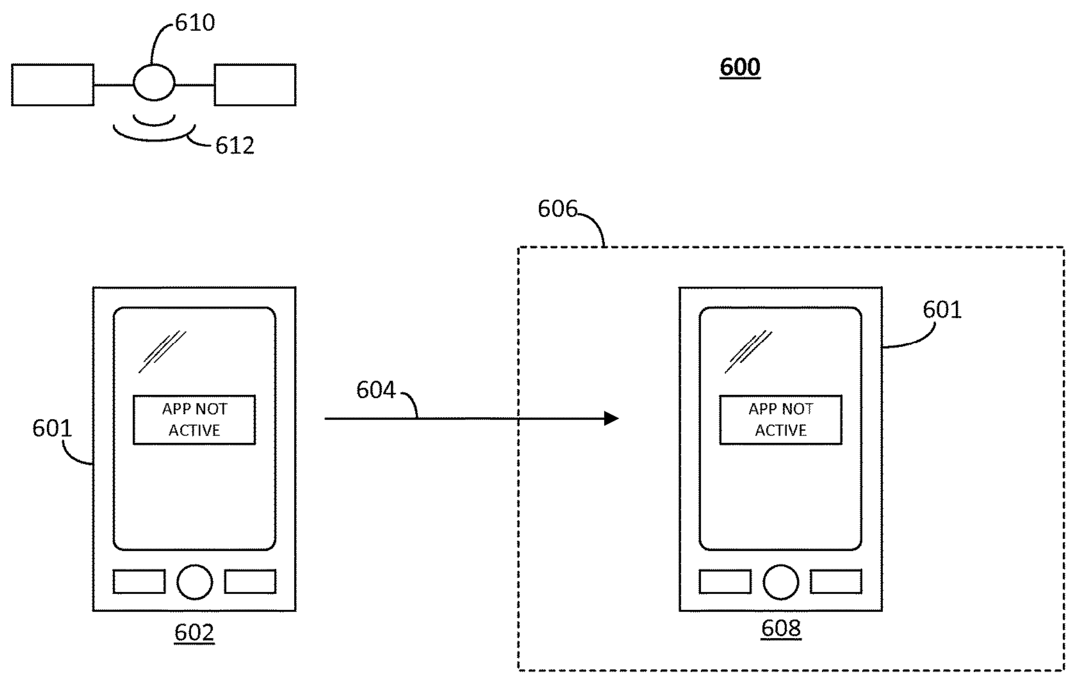
FIG. 6 is a system diagram showing geo-fencing of a vibration alert application in accordance with some embodiments.

FIG. 6 is a system diagram showing geo-fencing 600 of a vibration alert application in accordance with some embodiments. A communication device 601 is shown in a first location 602 that is out of a geo-fenced region 606. The geo-fenced region 606 is a geographically defined region, such as, for example, a construction site. Outside of the geo-fenced region the vibration alert application can be configured to not send alert messages to the associated vibration alert accessory. The geo-fenced region can be defined by a location coordinate and a distance (i.e. defining a circle where the distance is the radius of the circle). In some embodiments the geo-fenced region 606 can be defined by a polygon having a plurality of vertices, each defined by a coordinate location. The coordinates can be given, for example, in latitude and longitude. The communication device 601 can include a satellite positioning receiver to receive positioning signals 612 from positioning satellites 610 to determine its location, as is known. For example, the vibration alert application on the communication device 601 can request location updates from the satellite positioning receiver, and compare the present location of the communication device 601 to the geo-fenced region 606. When the communication device 601 moves from position 602, as indicated by arrow 604, to position 608 inside the geo-fenced region 606, the vibration alert program can determine that the communication device 601 is in the geo-fenced region 606 and commence sending alert messages to the vibration alert accessory. If the communication device 601 is then moved out of the geo-fenced region 606, the vibration alert application can detect that the communication device 601 is out of the geo-fenced region and cease sending alert messages. By essentially turning on alert messaging only in selected geo-fenced regions, battery life of the vibration alert accessory can be prolonged. In some embodiments, entry and exit into and out of geo-fenced regions can be recorded by the vibration alert application.

Figure 7:
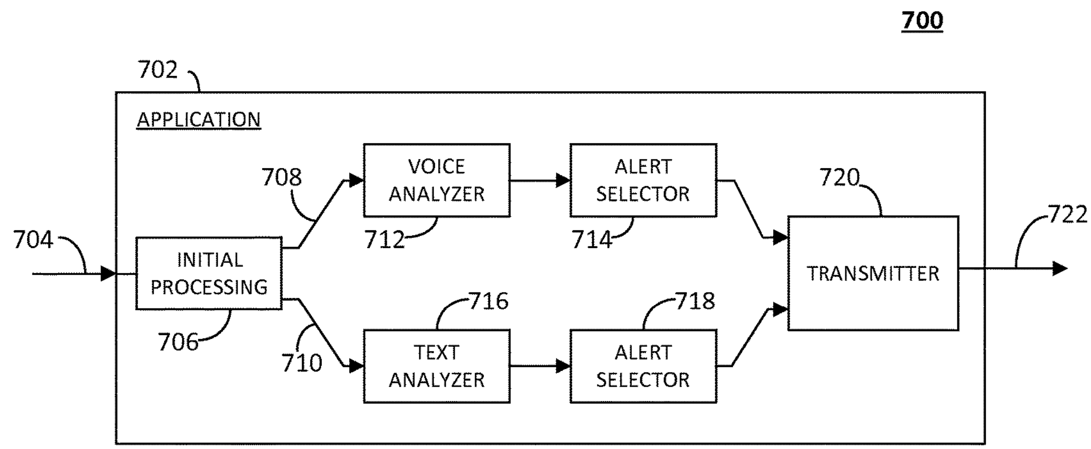
FIG. 7 is a message analysis diagram for a vibration alert application used in a communication device in accordance with some embodiments.

FIG. 7 is a message analysis diagram 700 for a vibration alert application 702 used in a communication device in accordance with some embodiments. As a message 704 is received by the vibration alert application 702, some initial processing can be performed at block 706 to determine what kind of message is being received. The message can be, for example, a voice message such as a PTT message containing speech, or the message can be text. Furthermore, other types of messages can be received, such as, for example, incoming phone call pages from a cellular phone network. For the purpose of discussion here, the example of FIG. 7 addresses voice and text messages, and those skilled in the art will understand that the same principles can be adapted to other types of messages.

A voice message 708 is analyzed by a voice analyzer function 712, which can look for voice characteristics that indicate, for example, stress in the speaker's voice, an indication of imminent danger, or other conditions that can dictate that special alerting is used. Once analyzed, an appropriate alert (i.e. vibration pattern) is selected by alert selection function 714. The alert selected can correspond to a category of the received message, such as who it is from, whether it is work related or personal related, or a special alert type, and so on. The alert selection function 714, upon selecting an appropriate alert, forms an alert message that is provided to the transceiver 720 for transmission to the vibration alert accessory, which implements a vibration pattern in correspondence with that selected by the alert selection function 714.

Likewise, a text message 710 can be analyzed by a text analyzer 716, which can look at the source of the text message, as well as the content of the text message. Generally the source of the text message will dictate the category of the alert unless some special words or a code appear in the text massage that dictate a special alert be used. Once the text message is analyzed, an alert selection function 718 selects the appropriate vibration pattern to be used in alerting the user and forms an alert message which is provided to the transceiver 720 for transmission to the vibration alert accessory.

Figure 8:
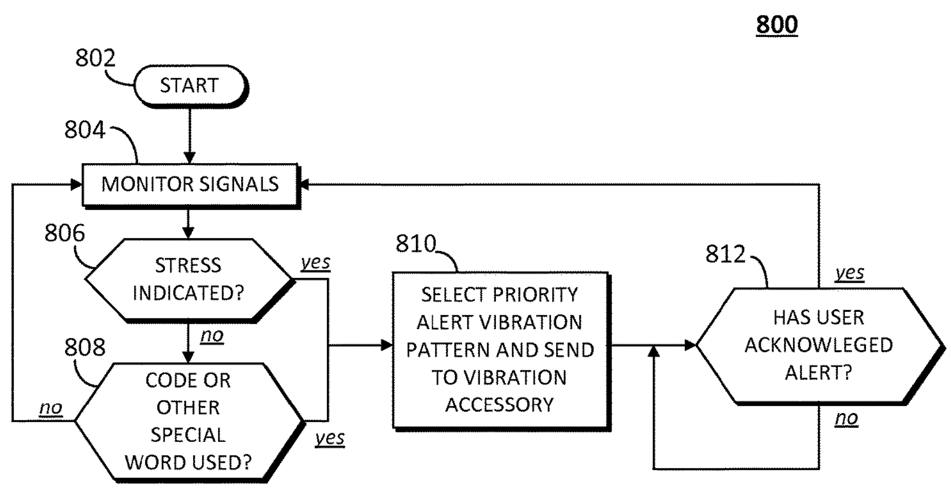
FIG. 8 is a flow chart of a method of analyzing messages received by a communication device using a vibration alert application in accordance with some embodiments.

FIG. 8 is a flow chart 800 of a method of analyzing messages received by a communication device using a vibration alert application in accordance with some embodiments. At the start 802, the vibration alert application is executing on the communication device, and has verified that the vibration alert accessory is present and has established a link with the vibration alert accessory. In step 804 the method 800 commences monitoring signals (messages) received at the communication device. When a message is received, the method 800 proceeds to step 806 where the message is analyzed based on its type, source, and possible content. For example, if the message received indicates a stress situation, such as if the message is a voice message and the speaker appear to be shouting then a special alert type may be indicated. In step 808 the method 800 can look for other conditions, such as the presence of commands or code words in the message (text or voice). In step 810 the method 800 selects and sends the appropriate alert and vibration pattern for the alert to the vibration alert accessory. In step 812 the method can allow the user to acknowledge the alert by, for example, pressing an acknowledgement button on the vibration alert accessory while it is vibration or playing the selected vibration pattern. The method 800 can be modified in accordance with other teachings disclosed herein, such as by, in step 804, determining a location of the communication device and only proceeding when the communication device is located within a designated geo-fenced alerting region. Likewise, the method 800 can be set to commence only during specified times, such as during work hours.

Figure 9:
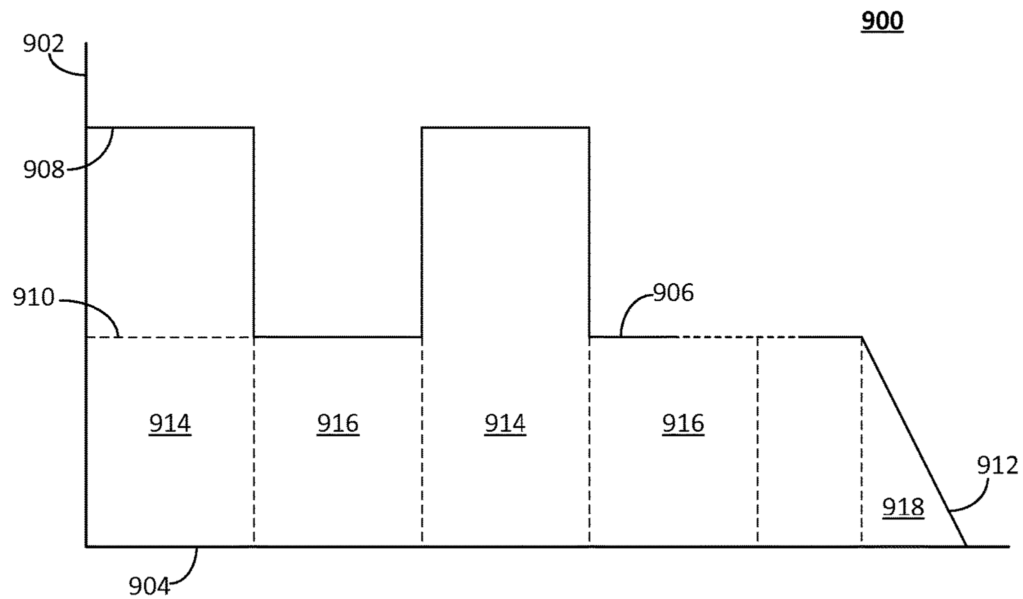
FIG. 9 is a graph chart showing vibration patterns using different magnitudes of vibration in accordance with some embodiments.

FIG. 9 is a graph chart 900 showing vibration patterns using different magnitudes of vibration in accordance with some embodiments. The vertical axis 902 represents vibration magnitude, increasing in the upwards direction. Magnitude can be expressed, for example, as the force generated by the rotation of the eccentric mass by the vibration motor, which can be controlled by the rotational velocity (expressed in revolutions per minute, for example). Since the vibration alert accessory can use a larger vibration motor than is used in portable communication devices, the magnitude of the vibrations produced by the vibration alert accessory are much larger, up to an order of magnitude larger in some cases. The horizontal axis 904 represents time, increasing to the right. The vibration pattern can commence for a first interval 914 at a first magnitude 908. At the end of interval 914, the amplitude can be lowered to magnitude 910 for a second interval 916 rather than ceasing vibration (e.g. as in FIG. 3). The different magnitudes 908, 910 can be repeated in first and second intervals 914, 916, respectively. In interval 918 the magnitude can be ramped down by slowing the vibration motor to a halt. Thus, chart 900 shows an example of modulating the vibration magnitude over time where the magnitude is varied between non-zero values (i.e. the motor is not turned off, as in pulsing patterns).

Figure 10:
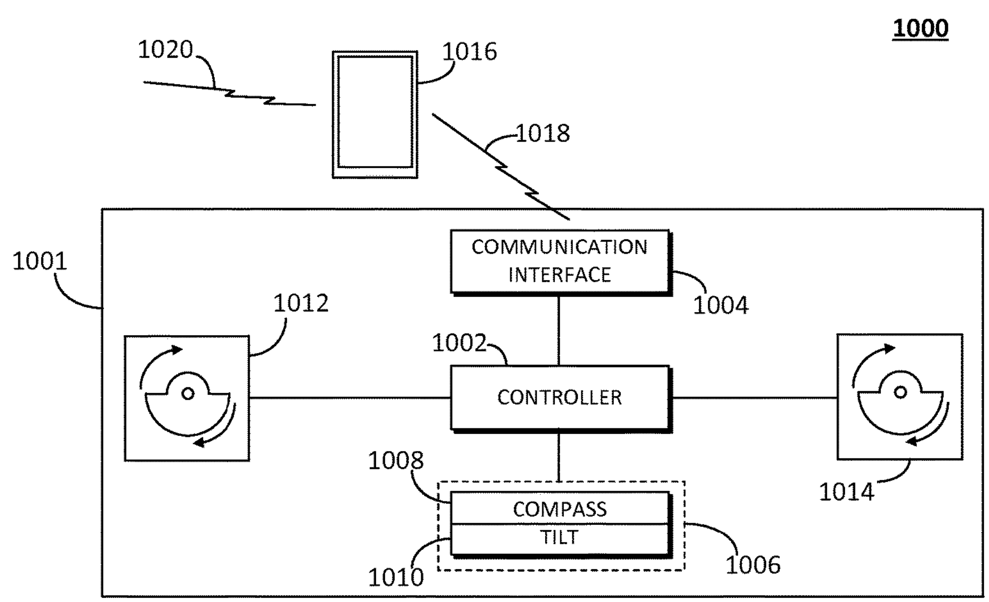
FIG. 10 is a system diagram of a vibration alert system that provides orientation and guidance to a user in accordance with some embodiments.

FIG. 10 is a system diagram of a vibration alert system 1000 that provides orientation and guidance to a user, in accordance with some embodiments. A vibration alert accessory 1001 is employed in a form factor that allows a user to perceive direction and orientation, such as, for example, in a helmet. The vibration alert accessory 1001 includes a controller 1002 that is coupled to a communications interface 1004, which can be a local wireless network radio communications interface (e.g. IEEE 802.11 or 802.15). The controller 1002 can receive messages from an associated communication device 1016 via signals 1018 received by the communications interface 1004. The controller 1002 is further coupled to orientation components 1006 which can include an electronic compass 1008 and a tilt sensor 1010. The compass can be oriented in a known orientation with respect to the apparatus (i.e. helmet) in which it is mounted so as to allow the controller to determine the direction in which the apparatus in oriented (i.e. in which direction the user is looking). The tilt sensor 1010 can comprise a three dimensional array (i.e. three mutually perpendicular axes) of micro-electromechanical switches having various resistances so as to indicate the direction of gravity and other acceleration, and therefore the tilt orientation of the apparatus in which the vibration alert accessory 1001 is disposed can be determined. The communication device 1016 can include location determining components (e.g. satellite positioning receiver system), so that the location of the user can be determined. The controller 1002 is further coupled to a plurality of vibrator motors, including a first vibrator motor 1014 and a second vibrator motor 1012. The first vibrator motor 1014 can be mounted on a right side of the apparatus in which the vibration alert accessory 1001 is housed, and the second vibration motor can be mounted on a left side of the apparatus in which the vibration alert accessory 1001 is housed. Thus, the user can not only be alerted as to an imminent danger, but also the orientation of the danger relative to the user's present position and orientation. The communication device 1016 can receive messages 1020 indicating such a danger or other situation to which the user's attention is to be drawn. The message 1020 can include location information indicating a location of the danger or other thing to which the user's attention is to be drawn. The communication device 1016 can form an alert message 1018 that is sent to the vibration alert accessory 1001. The alert message 1018 can indicate the location of the danger (i.e. coordinates), as well as the user's present position as determined by the communication device 1016, which can be used by the controller 1002 to determine the user's orientation with respect to the danger and the direction of the danger from the user's position. Accordingly, the controller can then activate the vibration motor closest to the direction of the danger to indicate to the user the direction of the danger. This process can be ongoing as the user changes position and orientation, the controller can adjust the vibration of the plurality of the vibration motors accordingly, increasing and decreasing the vibration amplitude of each vibration motor in correspondence with their orientation to the danger. That is, the vibration motor 1012, 1014 closest to the direction of the danger can have the highest vibration magnitude, while the vibration motor 1012, 1014 farthest from the direction of the danger can have the smallest, or no vibration magnitude, and this can be changed based on position, location, and orientation input from the communication device 1016, and the orientation components 1006. The communication device 1016 can periodically or continuously update the vibrational alert accessory as to the user's present position so that the controller can, in real time, adjust the vibrations of the first and second vibrator motors 1012, 1014 to indicate the orientation of the thing to which the user/wearer's attention is to be drawn is located with respect to the user's present position and orientation. Such alerting can be used, for example, in construction sites, firefighting settings, military settings, and so on. For example, a person in need of medical attention can activate a medical alert which results in the person's location being transmitted to an on-site medic. The medic's headgear, using directionally oriented vibration of vibration motors such as vibration motors 1012, 1014, can be silently directed to the person in need of aid. The identification and location of the situation to which attention is to be drawn can be determined, for example, by on-site personnel who can use their respective communication device to enter information indicating the direction, and/or location of the danger. That information can be then propagated to a plurality of others in the vicinity of the danger for use in vibration alerting to indicate orientation, location, and so on. Likewise, the multiple vibration motors 1012, 1014 (and others, if present), can be used to guide the user in conditions where visibility may be compromised. For example, the position and orientation of the user can be used to alert the user towards the direction of an exit from a building in a firefighting situation.

Figure 11:
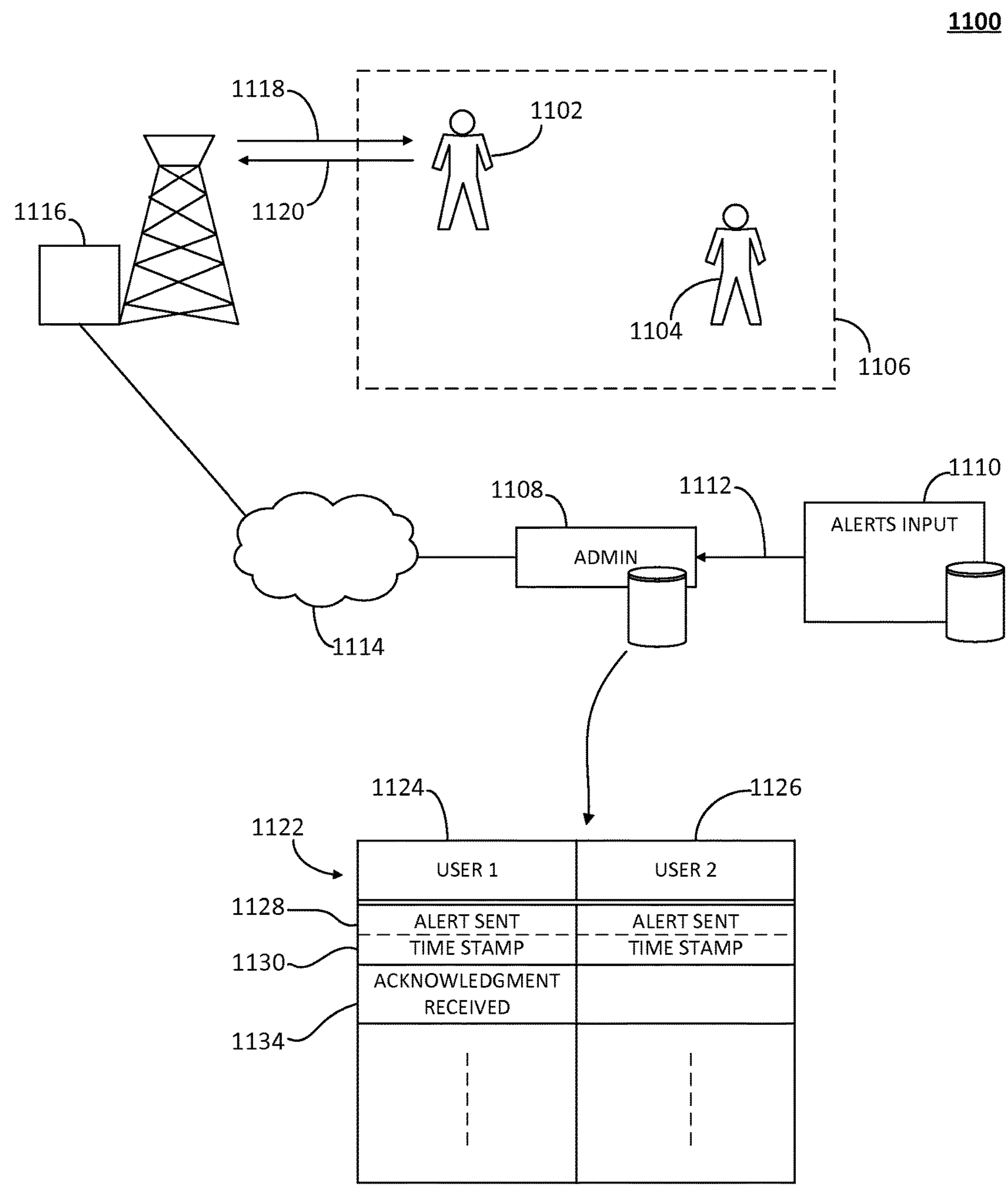
FIG. 11 is a system diagram of an alert system for logging alerting activity and user acknowledgements of users associated with an organization in accordance with some embodiments.

FIG. 11 is a system diagram of an alert system 1100 for logging alerting activity and user acknowledgements of alerts by users associated with an organization in accordance with some embodiments. A plurality of users such as a first user 1102 and a second user 1104 are associated with an organization (e.g. a construction operation, public safety, military, security, etc.). The users 1102, 1104 can be located within a region 1106 that can be, in some embodiments, a geo-fenced region, although it is not necessary that the user's be in a geo-fenced region in all embodiments. An administration entity 1108 can operate in a supervisory role and provide alerts to user 1102, 1004, etc. in region 1106, or which are otherwise affiliated with the organization. For example, an alert message 1110 can be provided 1112 to the administration entity 1108 for propagation to the users. The alert can indicate some urgent matter as described with reference to previous figures. The administrative entity 1108 can send a message through a network 1114 to a wide area radio communications site 116, which can transmit the message to the users. Thus a transmitted message 1118 can be received by user 1102. The transmitted message can include information, as well as an indication of a preferred alert pattern to be used. The communication device used by a user receiving the message 1118 can process the message upon receiving it, and determine what form of alerting to use. When a strong vibration alert is needed (e.g. for urgent messages), the user's communication device will enable an associated vibration alert accessory to create a vibratory alert. In response, user 1102 can respond to the message by reading or listening to the user's communication device, or by simply pressing a button at the vibration alert accessory. Once the user acknowledges the alert (e.g. by pressing a button, answering a call, etc.). The user's acknowledgement indicates the user received the alert. An acknowledgment message 1120 can then be generated by each user who has acknowledged the message as received, and sent back to the administration entity 1108. The alerts may or may not be vibration alerts. In some embodiments, for non-urgent alerts, the communication device used by a user can generate an audible alert and/or a low magnitude vibration alert. If the user does not acknowledge the alerting by the communication device within a preselected period of time, the communication device can then form a vibration alert message that is transmitted to the vibration alert accessory associated with the communication device and worn or carried by the user. By avoiding using the vibration alert accessory for non-urgent alerts in this manner, battery life of the vibration alert accessory can be prolonged. The user can acknowledge the alert at either the communication device or the vibration alert accessory, and an acknowledgement message can be transmitted back to the administration entity.

The administration entity 1108 can maintain a record 1122 of all alerts and individual acknowledgements received. For example, a column 1124 can correspond to the first user 1102, and a second column 1126 can correspond to the second user 1104. In each column a record can be kept of, for example, an alert being sent 1128, along with a time stamp 1130 indicating when the alert was sent. Similarly an acknowledgment entry 1134 can indicate that the user acknowledged the alert (with or without a timestamp and with or without the acknowledging user's location). In the event that user does not acknowledge an alert, the administrative entity 1108 can send a message to user's nearby the non-acknowledging user to interact with the non-acknowledging user, which can prompt the non-acknowledging user to then acknowledge the alert, or prompt those checking on the non-acknowledging user to seek assistance if, for example, the non-acknowledging user is in need of assistance.

The records 1122 can be used, in some embodiments, to reduce insurance costs. Since the organization can show alerting and acknowledgement compliance, the organization may be entitled to a discount on liability insurance. The record 1122 can also be used to show compliance with regulations, such as when the vibration alert device is disposed in a safety article (e.g. high visibility vest, hard hat/helmet, etc.), indicating, by the acknowledgements, that the users are using their safety gear in which the vibration alert accessory is disposed.

Vibration accessory devices (e.g. 104) can produce vibration magnitudes sufficient for use in some physiotherapy applications. Localized vibrations produced by a vibration accessory device can be used, for example, for relieving pain in selective areas of the body, and for sensing a user's walking behavior and providing vibrational feedback to assist in ambulatory therapy. In some embodiments the vibrations can be synchronized with music to which the user or patient is listening. It has been found that the most receptive body locations for vibration perception includes the ankle, waist, foot, knee, shoulder, and upper arms. On the average, the waist is considered to be reasonably comfortable, and is quite sensitive. Vibration at the waist does not interfere with any waist movement as compared placing a vibration accessory on the hand, for example. However, the best body location according to sensitivity and comfort tests for vibration has been found to be the ankle. Another aspect of vibration use in physiotherapy is known as adaptation, which refers to the change in the perception of a stimulus after prolonged stimulation. Adaptation increases the sensitivity threshold and decreases the subjective magnitude of a perceived vibration. By varying vibrational magnitude over time, however, the adaptation effect is avoided. There are four types of receptors in hairless skin: Pacinian corpuscles, Meissner's corpuscles, Merkel's discs and Ruffini endings. The Pacinian corpuscles in the skin and fascia detect rapid vibrations (of about 200-300 Hz); the Meissner corpuscles respond to light touch, and they adapt rapidly to changes in texture (vibrations around 50 Hz). The Merkel discs detect sustained pressure. The Ruffini endings detect tension deep in the skin and facia. Meisser, Pacinian corpuscles and Ruffini endings afferents are directly link to muscle activation for relaxation. Reflex muscle contractions have been studied with respect to the vibration frequency and amplitude changes, concluding that the phenomenon is due to the stretch reflex in which there is a tonic contraction of muscle in response to a stretch force being created by vibrations.

Figure 12:
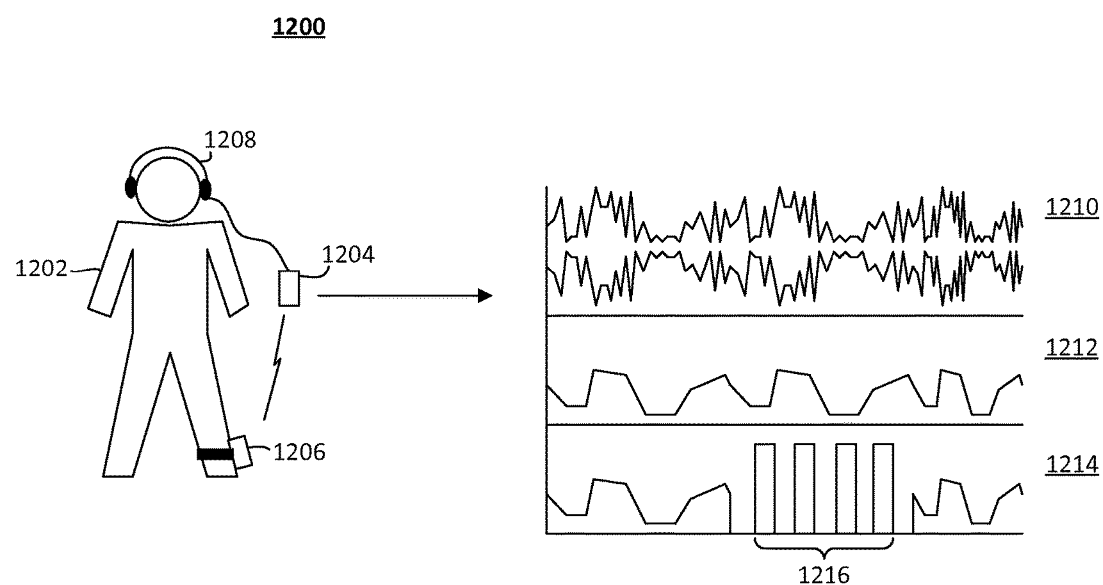
FIG. 12 is a system diagram of a mobile vibratory system for physiotherapy, in accordance with some embodiments.

FIG. 12 is a system diagram of a mobile vibratory system 1200 for physiotherapy, in accordance with some embodiments. The system 1200 illustrates both apparatus and methods of operating the apparatus to provide vibration stimulus for physiotherapy. In general, a person 1202 (alternatively referred to as a user or patient), has a communication device 1204, which can be, for example, a cellular telephone device. The communication device 1204 includes and executes a physiotherapy application program that allows the communication device to control a vibration accessory 1206 via a wireless or wired link. The vibration accessory 11206 can be designed substantially as shown in FIGS. 2 and 10 and includes one or more vibration motors that can be controlled to vibrate at different frequencies/magnitudes. The communication device 1204 can send control signals to the vibration accessory 1206 to control the frequency of the vibration produced by the vibration accessory 1206.

An algorithm for a closed loop feedback control of the vibration of the vibration accessory can be used by the user 1202 to calibrate the vibrations produced by the vibration accessory 1206 to the user's preference. After placing the vibration accessory 1206 on the user's body at a desired location. Then the user 1202 can operate the physiotherapy application on the communication device to commence a calibration routine where, for example, a virtual slider bar can be displayed on the communication device that can be moved (i.e. via a touch screen input). As the user 1202 adjusts the or moves the slider bar, the communication device can change the frequency of the vibration accordingly. Once the user finds a desired frequency, the user can, for example, double tap the slider bar to select the frequency corresponding to the position of the slider bar. Once the desired frequency is selected, the user can select a time for the vibration to continue, or simply stop when desired.

In some embodiments the user 1202 can directly select a desired vibration frequency or magnitude via the physiotherapy application on the communication device 1204. However, setting the vibration to one setting can result in sensory adaptation where over time the perceived magnitude of the vibration diminishes. Accordingly, it is preferred to vary the frequency of vibration. In some embodiments, then, the vibration frequency can be controlled to vary over time. The physiotherapy application can provide a selection of vibration patterns from which the user can select, including a randomized pattern. Generally the range of vibration is from about 45 Hz to 300 Hz, which research has shown are most effective. However, the user can specify a frequency range by, for example, setting an lower and an upper limit, allowing the communication device 1204 to control the vibration accessory 1206 to vibrate at frequencies in the indicated range.

In some embodiments the user 1202 can set the physiotherapy application on the communication device 1204 to vibrate in accordance with a sound or sounds played by the communication device. For example, modem communication devices are capable of storing music files (e.g. "mp3" files) which can be played by the communication device. Thus, the communication device can play such a file, allowing the user 1202 to listen to music over a speaker or speaker device connected to, or integrated into, the communication device. For example, the user can connect a pair of headphones 1208 to the communication device 1204 at an audio jack of the communication device 1204. The communication device then play an audio file, which produces an audio signal 1210 (shown in magnitude versus time) played over the headphones 1208. The communication device 1204 then controls frequency 1212 (shown in frequency or magnitude over time) of the vibration accessory 1206 to vary substantially in correspondence with the audio signal 1210. In some embodiments the frequency 1212 can vary with a primary or dominant frequency of the audio signal 1210. Frequency signal 1214 shows a variation where, while playing the audio signal 1210, the communication device 1204 receives a call or other alert that requires notifying the user 1202. To notify the user 1202, the frequency signal 1214 is briefly modified during time 1216 to not correspond with the audio signal 1210, and to instead provided a preselected notification pattern (e.g. four pulses of the same frequency/magnitude). The user 1202 will perceive the preselected notification pattern as it does not correspond with the audio signal 1210.

In some embodiments, rather than playing an audio file the communication device 1204 can connect to a streaming service via a wide area wireless network (e.g. a cellular telephony system), and stream music or other audio content from a remote server or service (e.g. Spotify, Pandora, etc.). In some embodiments the physiotherapy application running on the communication device 1204 can provide recommendations of audio content, including streaming content, based on the user's preferences, or based on the type of vibration profile desired by the user. For example, while varying the vibration frequency/magnitude in correspondence with the audio content being played, rock music will produce a different vibrational profile over time than classical music. Thus rock music can be recommended for an aggressive vibration profile, and classical music can be recommended for a serene vibration profile, and so on with other types of audio content.

As shown here, the vibration accessory is attached at the ankle of the user 1202. However the accessory device can be placed on other portions of the user's body, and can have different form factors. In some embodiments the vibration accessory can include a plurality of units, each of which include a vibration motor, and can be coupled to the communication device 1204 so that the vibration of each unit can be controlled by the communication device 1204.

Figure 13:
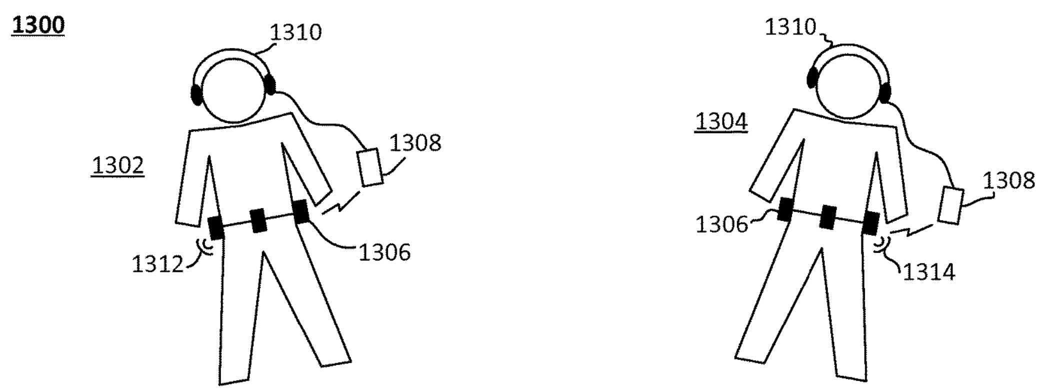
FIG. 13 is a system diagram of a mobile vibratory system for physiotherapy, in accordance with some embodiments.

FIG. 13 is a system diagram of a mobile vibratory system 1300 for physiotherapy, in accordance with some embodiments. Specifically, the physiotherapy is used to assist in physical therapy such as, for example, walking. A vibration accessory 1306 can include several vibration units, each of which can be vibrate independently, and each of which include an accelerometer or tilt sensor. Each unit is initially calibrated after being placed on the user while the user is positioned in a neutral position such as standing upright (without leaning). Once a neutral position is calibrated, the user can begin a movement exercise. If a body portion on which one of the units is placed exceeds a preselected tilt or angle threshold from neutral, then that particular unit can vibrate, indicating to the person to adjust the user's body position to avoid the tilt. For example, in position 1302 the user is leaning to the left by more than the allowed tilt threshold. Accordingly, the unit on the user's left side vibrates 1312. In position 1304 the user is leaning to the right by more than the allowed tilt threshold. Accordingly, the unit on the user's right side vibrates 1314. In some embodiments, the user can play and listen to audio media while engaging in the exercise such as by earphones 1310. All of the vibration accessory device's units can vibrate in unison, in correspondence with the audio media being played. But when one of the units detects an excess tilt that exceeds its tilt threshold (e.g. 15 degrees from vertical), it can vibrate using a warning pattern, similar to that of time 1216 in signal 1214 of FIG. 12. Thus, a user can listen to music or other audio content, receiving vibratory physiotherapy while engaging in physical therapy, and receive corrective vibrational feedback during the physical therapy.

Embodiments such as those disclosed herein provide the benefit of providing physiotherapy through customized vibration or vibration patterns. The vibrations can be set to a selected frequency or magnitude, or they can be varied over time to prevent sensory adaptation. Furthermore, vibrations can be used to correct body alignment during physical therapy by vibrating when a body portion is out of position for the exercise. By coupling the vibration with audio content, a user can stimulate both the tactile and aural senses to achieve relief from stress, muscle pain, and other maladies.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The use of "software," and other references to code herein, are to be construed as referring to the physical configuration of a physical media, such as, for example, electronic media (both active and passive), optical media, magnetic media, and so on, which can be read (i.e. transferred) to electronic media in a processor or other computational structure for logic operations to produce output that is also used to configure physical media and/or drive other circuitry connected to the processor, accordingly. The physical configuration of the media is specified by design to cause the processor to provide an output according to its physical design as a collection of circuitry and circuit components. As such, any reference to software or other code is not to be construed as referring to any abstract idea which generally merely describes the intended function of the actual software. It will be appreciated by those skilled in the art, however, that software can be designed in a wide variety of alternative implementations to achieve the same general functions.

An embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A method of generating a vibration for use in physiotherapy, comprising:

coupling a vibration accessory wirelessly to a communication device, wherein the communication device executes a physiotherapy application that controls the vibration accessory, and, responsive to the control of the communication device, a frequency of vibration produced by the vibration accessory is varied;

playing sound by the communication device over a speaker device of, or connected to the communication device;

the communication device varying control of the frequency of vibration produced by the vibration accessory in correspondence with the sound played by the communication device;

while playing the sound, the communication device receiving an alert; and responsive to receiving the alert, the communication device modifying control of the vibration to not correspond with the sound and instead control vibration of the vibration accessory according to a preselected notification pattern indicating that the communication device received the alert.

2. The method of claim 1, wherein playing the sound comprises playing music.

3. The method of claim 2, further comprising:

receiving at the communication device a selection of music from a user of the communication device.

4. The method of claim 3, wherein the selection of music is a selection of music stored on the communication device in electronic files.

5. The method of claim 3, wherein the selection of music is a selection of a streaming source, wherein the communication device streams the selected music from the streaming source over a wide area wireless network.

6. The method of claim 1, wherein varying control of the frequency of vibration comprises varying control of the frequency of vibration in correspondence with a relative volume of the sound over time.

7. The method of claim 1, wherein varying control of the frequency of vibration comprises varying control of the frequency of vibration in correspondence with a dominant frequency of the sound over time.

8. The method of claim 1, wherein varying control of the frequency of vibration comprises varying control of the frequency of vibration in a range of vibration from 45 Hz to 300 Hz.

9. The method of claim 1, wherein varying control of the frequency of vibration comprises varying control of the frequency of vibration in a range selected by a user of the communication device.

10. The method of claim 9, further comprising:

performing a feedback calibration process where the vibration frequency of the vibration accessory is varied and the user indicates a range of preferable frequencies.

11. The method of claim 1, wherein the vibration accessory comprises a plurality of units configured to be worn together around a waist of a user, the method further comprises:

sensing, at each of the plurality of units, acceleration with respect to gravity;

each of the plurality of units determining a tilt of the unit; and when a unit of the plurality of units determines its respective tilt exceeds a tilt threshold, the respective unit changing its vibration control to a preselected vibration pattern to indicate exceeding the tilt threshold.

12. A physiotherapy system, comprising:

a vibration accessory that produces a vibration, wherein a frequency of the vibration is variable subject to a control; and a communication device which executes a physiotherapy application that provides the control of the vibration accessory wirelessly and which is coupled to the vibration accessory, wherein the communication device is configured to vary the control provided to the vibration accessory in correspondence with a sound played by the communication device, and wherein the communication device is configured to receive an alert, and in response the alert, interrupt control of the vibration accessory in correspondence with the sound and instead control the vibration accessory to vibrate according to a preselected notification pattern that indicates reception of the alert at the communication device.

13. The physiotherapy system of claim 12, wherein the sound played by the communication device is music.

14. The physiotherapy system of claim 13, wherein the communication device is configured to receive at the communication device a selection of music from a user of the communication device.

15. The physiotherapy system of claim 14, wherein the communication device comprises the selection of music stored on the communication device in electronic files.

16. The physiotherapy system of claim 14, wherein the communication device is configured to stream the selected music from a streaming source over a wide area wireless network.

17. The physiotherapy system of claim 12, wherein the communication device is configured to vary the control provided to the vibration accessory in correspondence with a relative volume or a primary frequency of the sound played by the communication device.

18. The physiotherapy system of claim 12, wherein the communication device is configured to vary the control provided to the vibration accessory in a range of vibration from 45 Hz to 300 Hz.

19. The physiotherapy system of claim 12, wherein the communication device is configured to vary the control provided to the vibration accessory in a range selected by a user of the communication device.

* * * * *